United States Patent [19]

Römer

[11] Patent Number: 4,466,519

[45] Date of Patent: Aug. 21, 1984

[54] DRIVE AND BRAKE SYSTEM FOR MOTOR VEHICLES WITH FOUR-WHEEL DRIVE

[75] Inventor: Friedrich W. Römer, Neuss, Fed. Rep. of Germany

[73] Assignee: International Harvester Co., Chicago, Ill.

[21] Appl. No.: 252,524

[22] Filed: Apr. 9, 1981

[30] Foreign Application Priority Data

Apr. 30, 1980 [DE] Fed. Rep. of Germany ....... 3016788

[51] Int. Cl.³ .............................................. B60K 41/24
[52] U.S. Cl. ................................ 192/13 R; 192/0.082; 180/244
[58] Field of Search .................. 192/13 R, 13 A, 4 A, 192/12 C, 0.082; 180/244

[56] References Cited

U.S. PATENT DOCUMENTS

| 2,872,000 | 2/1959 | Herndon et al. | 192/4 A |
| 2,927,475 | 3/1960 | Burckhardt | 192/4 A |
| 3,001,415 | 9/1961 | Smirl | 192/4 A |
| 3,046,813 | 7/1962 | Bixby | 192/4 A |
| 4,084,672 | 4/1978 | Avins | 192/13 R X |
| 4,103,764 | 8/1978 | Iijima | 192/4 A |
| 4,262,783 | 4/1981 | Scarrott et al. | 192/4 A |

FOREIGN PATENT DOCUMENTS 738295 10/1955 United Kingdom ............. 192/13 R

Primary Examiner—George H. Krizmanich
Attorney, Agent, or Firm—Boris Parad; F. David Aubuchon

[57] ABSTRACT

A braking arrangement for a four-wheel drive vehicle, facilitating an engagement of the front-wheel drive when the service brakes acting on the vehicle rear axle are actuated.

2 Claims, 1 Drawing Figure

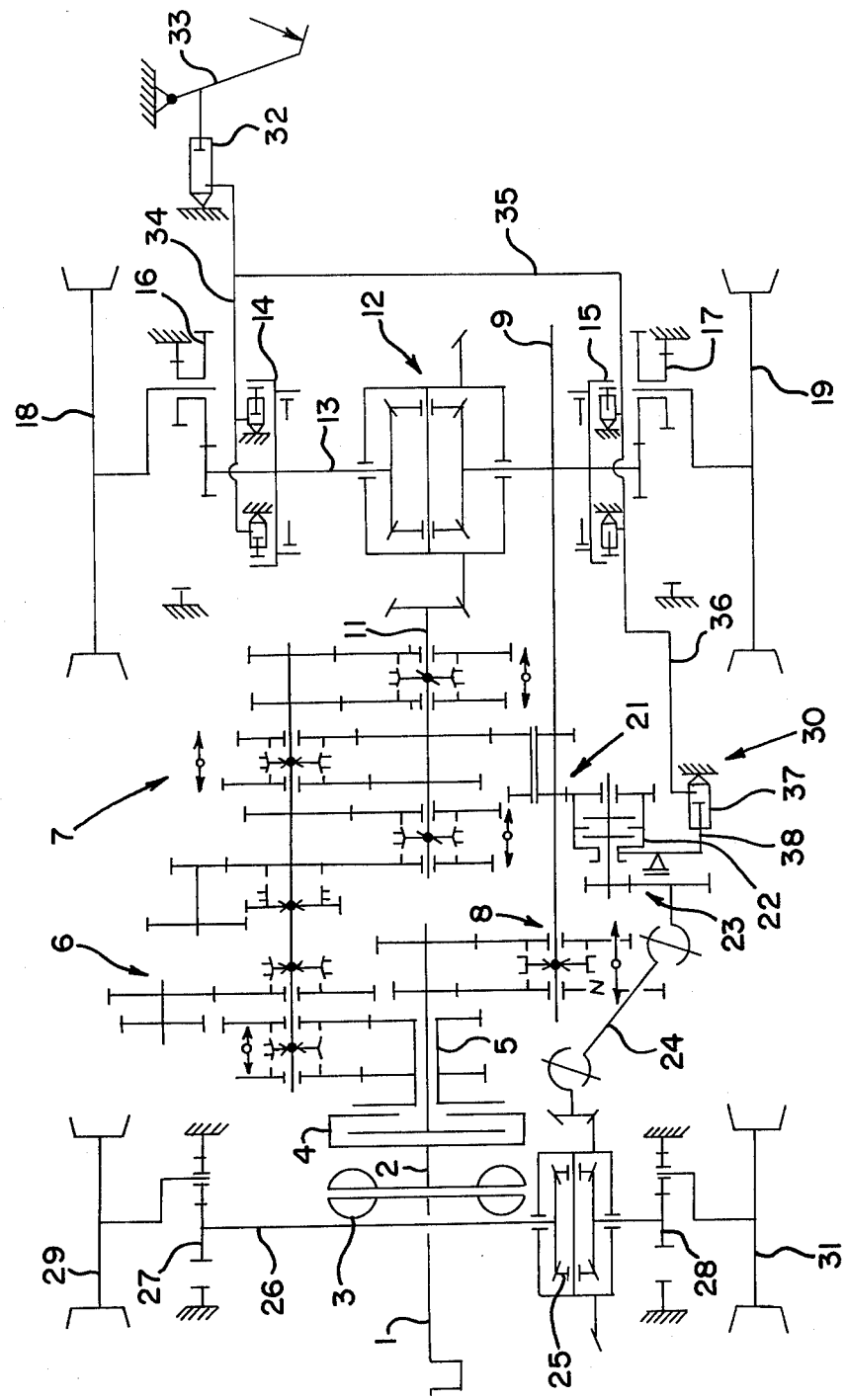

400,519

DRIVE AND BRAKE SYSTEM FOR MOTOR VEHICLES WITH FOUR-WHEEL DRIVE

INFORMATION DISCLOSURE STATEMENT

The invention relates to the layout of a drive and brake system for motor vehicles equipped with four-wheel drive, for farm tractors in particular, featuring a primary axle which—using conventional transmissions and final drives—is constantly driven by a drive engine and which can be braked by a service brake, and featuring a secondary axle which—by engaging the clutch of an auxiliary transmission—can optionally be connected to the drive train.

In principle, the German disclosure DOS No. 1960 780 presents a power transmission system of this particular design. On motor vehicles used for agricultural application, e.g. farm tractors, the specific modes of operations necessitate a well-balanced distribution of axle loads. Generally, farm tractors are laid out to carry and operate heavy implements. In these cases the axle load on the rear axle is considerable, and there is danger of the farm tractor's front axle not having the required wheel adhesion. Therefore, it is common practice to load the front axle by means of counterweights in order to achieve the required weight compensation. In cases where the service brake is part of the rear axle system only, the separate flux of force to the secondary axle will result in a reduced brake performance, particularly if the braked rear axle is load-relieved by an unfavourable axle load distribution as could be the case with empty rides, i.e. without carrying implements.

However, subject invention is based on the realization that the drive and brake arrangement on motor vehicles, particularly on farm tractors, can easily produce a considerably improved braking performance of the motor vehicle in question, if a specific mode is applied to link the drive system and the brake system.

Therefore, this invention is based on the objective of providing a drive and brake system of the initially mentioned design which ensures an excellent braking performance of the motor vehicle, particularly of a farm tractor, especially in cases where the braked axle is relieved of its load due to an unfavourable axle load distribution.

SUMMARY OF THE INVENTION

According to subject invention the problem is solved by using a transfer linkage to link the service brake with the clutch in a manner causing the clutch to automatically take up its engaged position when the service brake is actuated. By the above arrangement no additional brakes on the secondary axle are required to facilitate a four-wheel braking operation, since the actuating of the service brake on the primary axle causes an automatic locking of the auxiliary clutch unit, so that the front drive is engaged automatically.

The positive connection between the primary axle's service brake and the auxiliary clutch unit can be established by a number of modes. The transfer linkage can feature mechanical, pneumatic, hydraulic, or electric control elements.

Preferably, however, hydraulic means are used for the transfer linkage whereby said linkage features a line branching off the hydraulic fluid reservoir of the service brake and running to the clutch as well as a cylinder/piston unit located in the line upstream of the clutch.

For reasons of expediency a multi-disk clutch is used as auxiliary clutch.

BRIEF DESCRIPTION OF THE DRAWINGS

FIG. 1 is a schematic illustration of a vehicle driving and braking arrangement and detailed in the following:

DESCRIPTION OF THE PREFERRED EMBODIMENT

According to the diagram shown in FIG. 1, a drive engine (not detailed), by way of a crankshaft 1, operates a drive shaft 2 on which a hydrokinetic clutch 3 and a shifting clutch 4 are arranged.

The drive shaft 2 extends through a hollow shaft 5 which serves to operate an intermediate auxiliary transmission 6 and a gear-shift transmission 7. A power-take-off 8 on the drive shaft 2 operates a pto-shaft 9. By the intermediary of a differential gear 12 a drive shaft 11 of the gear-shift transmission 7 is in a drive connection with the primary axle 13 which serves as a rear axle of the vehicle. On either end of said primary axle 13 a service brake 14, 15 is installed. Following each service brake 14, 15 a final drive 16, 17 is installed serving to drive the rear wheels 18, 19 of the motor vehicle.

The gearshift transmission 7 drives an auxiliary transmission 21 which is equipped with a multi-disk clutch 22. Said clutch is followed by a pair of matching gears 23; a drive shaft 24 serves to put said pair of gears in drive connexion with a further auxiliary differential gear 25 which is part of a secondary axle 26 serving as front axle. By way of said front axle 26 and the interposed final drives 27, 28 the front wheels 29, 31 of the vehicle are driven. Between the service brakes 14, 15 and the clutch 22 an hydraulically actuated transfer linkage a coupling system 30 (described in detail later on) is provided.

To pressure-load the service brakes 14, 15 a main-brake cylinder 32 serves as pressure-medium reservoir. This main brake cylinder 32 is actuated by two parallelly arranged brake pedals 33. Brake lines 34, 35 are installed to connect the output side of the main brake cylinder 32 to the service brakes 14, 15. The brake line 35 is connected to the coupling system 30 comprising an additional line 36 leading to a cylinder/piston-unit 37, the opposite end of which is connected to the hydraulically controlled clutch 22 by means of a line 38.

The above described drive and brake layout operates as follows:

When the brake pedals 33 are operated, the main brake cylinder 32 delivers hydraulic fluid into the brake lines 34, 35, thereby pressure-loading the service brakes 14, 15. This particular case is based on the assumption that both brake pedals 33 operate in junction in the conventional manner. However, if the steering brake is to be applied, only one of the brake pedals is operated, resulting in only the appertaining service brake being pressure-loaded.

By pressurizing only one or both of the service brakes 14, 15 the rear axle 13 is braked. Through the brake line 35 and the line 36 the hydraulic fluid is simultaneously fed into the cylinder/piston-unit 37, from where the built-up pressure passes the line 38 and reaches the clutch 22 which—following the operating of the service brakes 14,15—automatically takes up its engaged position. When the clutch 22 is completely engaged, the auxiliary transmission 21 transfers the torque from the gear shift transmission 7 via the pair of meshing gears 23, shaft 24 and differential 25 to the axle 26. By the above action the front-wheel drive is engaged automatically, so that without requiring any additional brakes on the front axle 26 and following a braking of the rear axle only, an improved braking performance of the vehicle is achieved by adding an engine braking or resistance caused by the front-wheel drive engagement.

It stands to reason that the invention is not limited to the embodiment displayed, but allows for modifications within the scope of the claims. Therefore, the design of the transfer linkage can be different from the layout shown; i.e. a mechanically operated linkage can be used.

It is also conceivable to draw the power required from the hydraulic or the pneumatic power-generating system provided on the motor vehicle, the farm tractor in particular. In that case the appropriate control elements required for a control circuit must be provided.

What is claimed is:

1. Driving and braking arrangement for four-wheel motor vehicles, farm tractors in particular, having a primary axle constantly driven by a drive engine via a transmission and brakeable by a service brake, the arrangement comprising:

a hydraulic cylinder connected with a lever means for actuating thereof;

a brake hydraulic line linking said cylinder with said vehicle service brake;

said service brake operatively connectable with said primary axle upon the actuation of said cylinder, thereby applying the braking force to said primary axle;

said brake hydraulic line merging with a clutch line leading to a clutch transferring a torque from a vehicle transmission to a secondary axle differential;

another service brake being connectable with said primary axle, thereby braking both ends thereof;

said clutch line including a clutch engaging cylinder located between said clutch and said hydraulic cylinder;

said primary axle being a vehicle rear axle and said secondary axle being a vehicle front axle;

at least a pair of gears disposed between said clutch and said differential;

said clutch comprising a means permitting a gradual transfer of said torque between shafts rotating with different speeds and proportional to a brake force applied to said primary axle;

said hydraulic cylinder, said service brakes, and clutch cylinder being disposed in series upstream of said clutch;

whereby upon actuation of said cylinder by said lever means, the fluid impulse is communicated to said service brake for braking said primary axle rotation and simultaneously engaging said clutch via said clutch line, thereby engaging a secondary axle drive by transmitting torque thereto from said transmission when said service brake is activated.

2. Driving and braking arrangement according to claim 1, said clutch being a multi-disc clutch.

* * * * *